US007542813B2

(12) United States Patent
Nam

(10) Patent No.: US 7,542,813 B2
(45) Date of Patent: Jun. 2, 2009

(54) RAPIDLY OPTIMIZED WIRELESS MICROPHONE SYSTEM AND METHOD FOR CONTROLLING THEREOF

(76) Inventor: Hyo-Choul Nam, Sosa-dong 22-1, Wonmi-gu, Gyounggi-do, Boocheon-si (KR) 420-818

(*) Notice: Subject to any disclaimer, the term of this patent is extended or adjusted under 35 U.S.C. 154(b) by 931 days.

(21) Appl. No.: 10/475,305

(22) PCT Filed: Apr. 2, 2002

(86) PCT No.: PCT/KR02/00577

§ 371 (c)(1), (2), (4) Date: Jun. 1, 2004

(87) PCT Pub. No.: WO03/071829

PCT Pub. Date: Aug. 28, 2003

(65) Prior Publication Data

US 2004/0196986 A1 Oct. 7, 2004

(30) Foreign Application Priority Data

Feb. 21, 2002 (KR) ................................ 2002-9310

(51) Int. Cl.
*G06F 17/00* (2006.01)
*H04R 3/00* (2006.01)

(52) U.S. Cl. ........................................ 700/94; 381/111

(58) Field of Classification Search ................. 375/200, 375/202, 206, 141, 209; 700/94; 381/26, 381/91, 111, 121; 455/41.2
See application file for complete search history.

(56) References Cited

U.S. PATENT DOCUMENTS 5,946,343 A * 8/1999 Schotz et al. ............... 375/141
6,671,503 B1 * 12/2003 Niwamoto .................. 455/212
7,010,328 B2 * 3/2006 Kawasaki et al. ........ 455/569.1

OTHER PUBLICATIONS

Principles of Digital Audio, Ken C. Pohlmann, Copyright 2000; Fourth edition.*

* cited by examiner

*Primary Examiner*—Curtis Kuntz
*Assistant Examiner*—Andrew C Flanders
(74) *Attorney, Agent, or Firm*—Stein McEwen, LLP

(57) ABSTRACT

Disclosed is a wireless microphone system having a rapidly optimized MP3 audio encoder and decoder, capable of reducing the amount of calculation without losing voice to minimize power consumption and complexity of the system, and a method for controlling the microphone system. The rapidly optimized wireless microphone system comprises a transmitting part including an MP3 audio encoder, an FEC encoder, a modulator, a PN spreader, a high-frequency modulator, a power amplifier, a first controller, for converting an audio signal inputted through a microphone into an MP3 audio signal, FEC-encoding, and PN-spreading the MP3 audio signal, and then modulating the signal, to transmit it; and a receiving part including a low-noise amplifier, a high-frequency demodulator, a PN despreader, a demodulator, an FEC decoder, an MP3 audio decoder, an audio interface, an oscillator, a PLL circuit, and a second controller, for receiving the signal transmitted from the transmitting part, PN-despreading, FEC-decoding, and MP3-decoding the received signal, and then converting the signal into the original audio signal, wherein the MP3 audio encoder does not use psycho-acoustic modeling and, accordingly, performs quantization at a bit rate higher than a predetermined first bit rate without driving an outer repetitive loop of a repetitive loop required for the psycho-acoustic modeling, to thereby convert the audio signal inputted through the microphone into the MP3 audio signal.

2 Claims, 6 Drawing Sheets

[FIG 1]
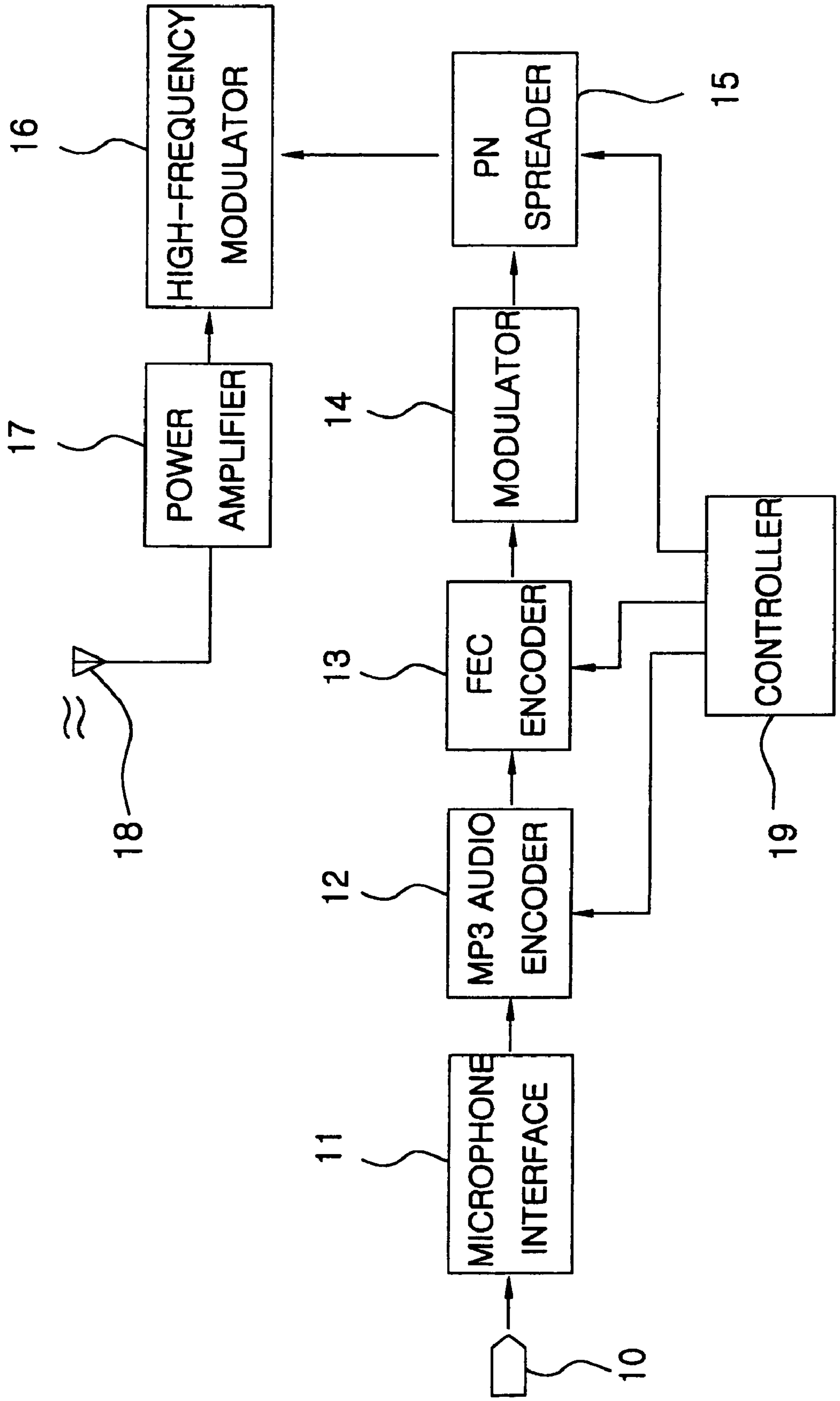

[FIG 2]
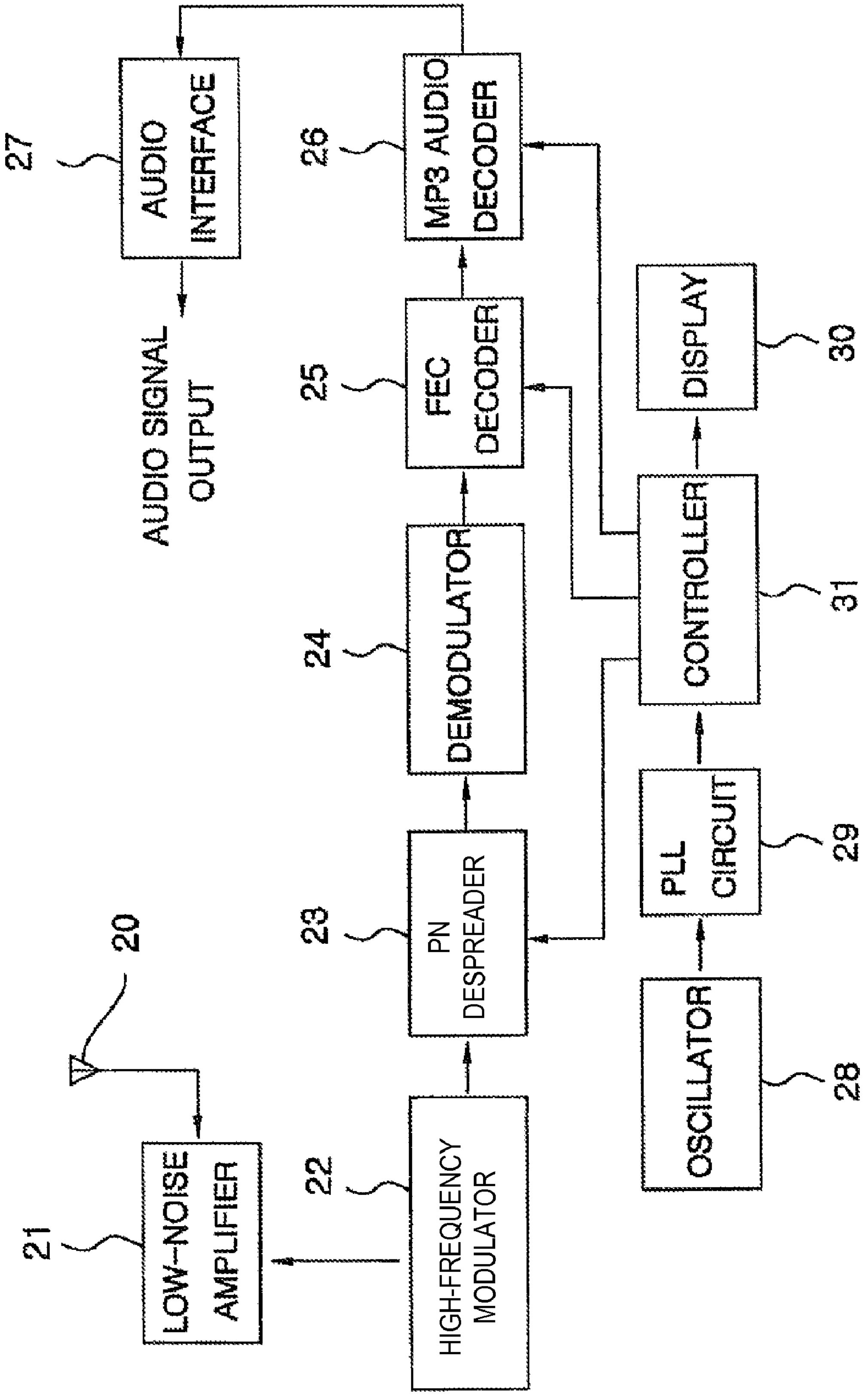

[FIG 3]
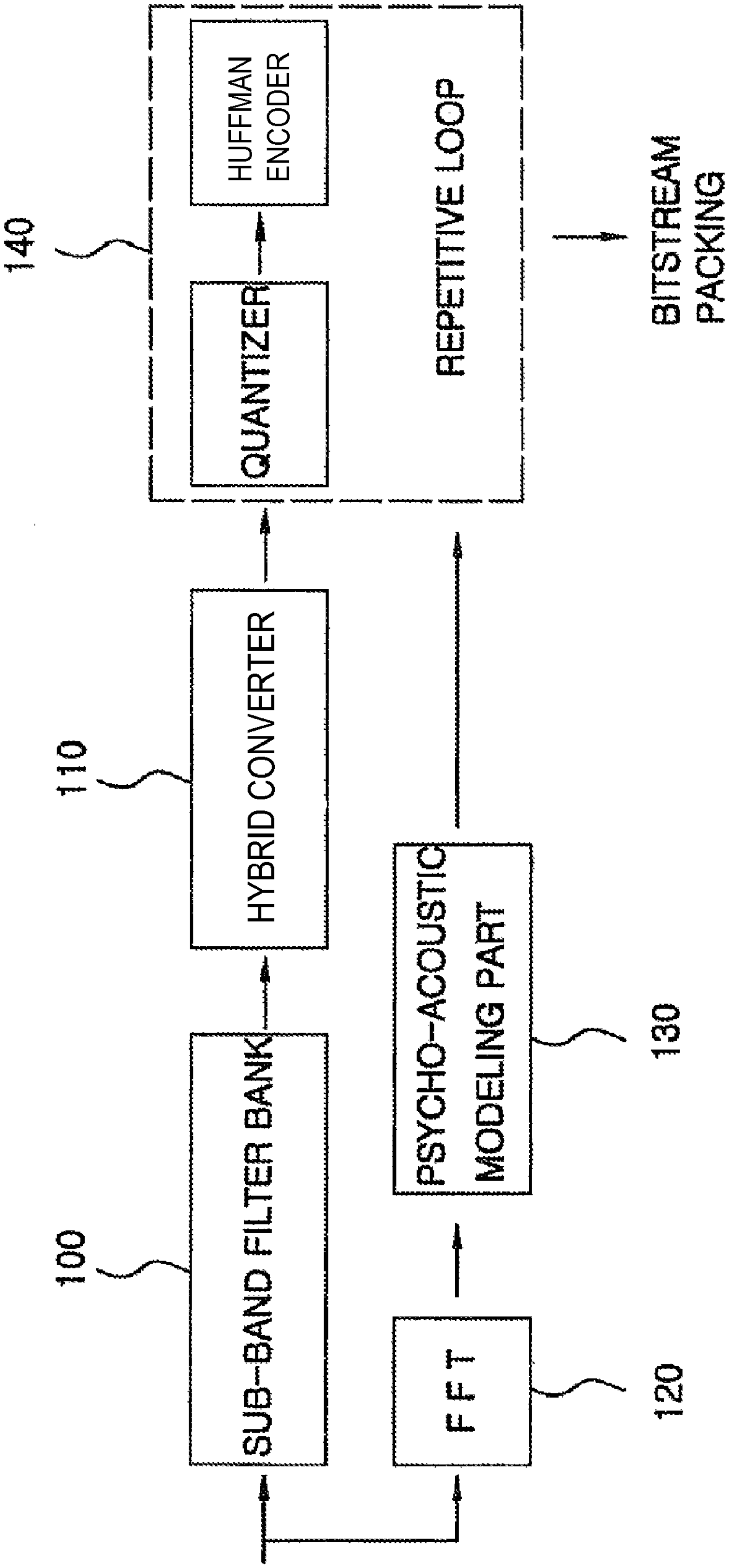

[FIG 4]
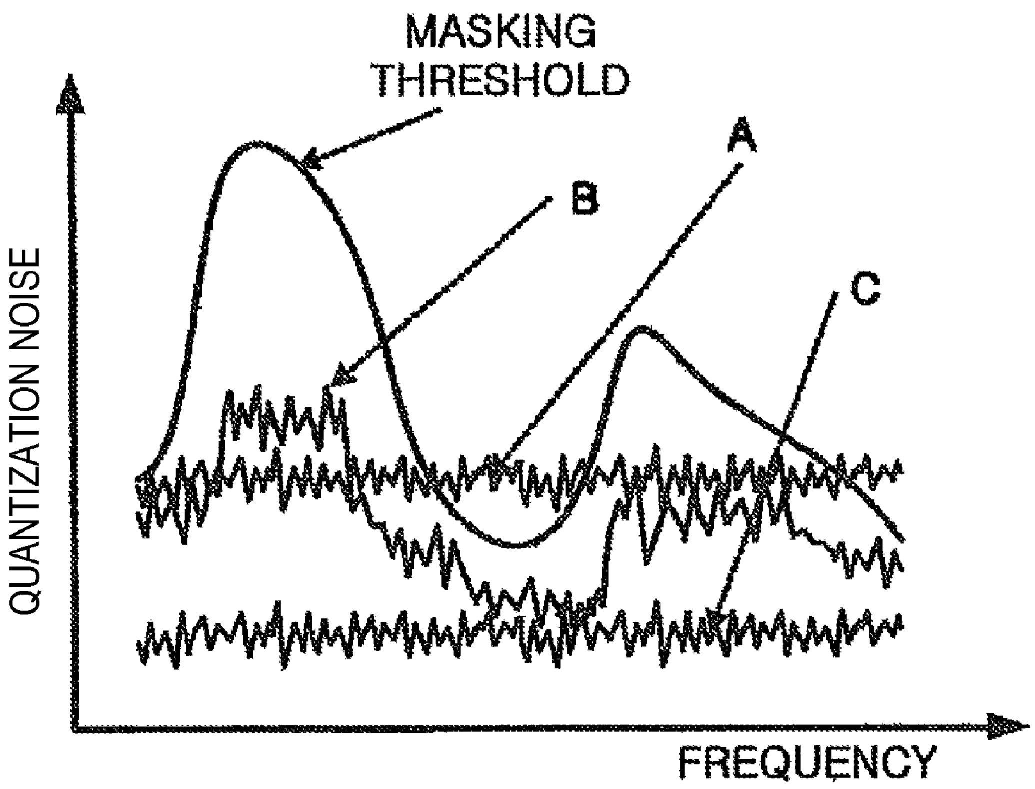

[FIG 5]
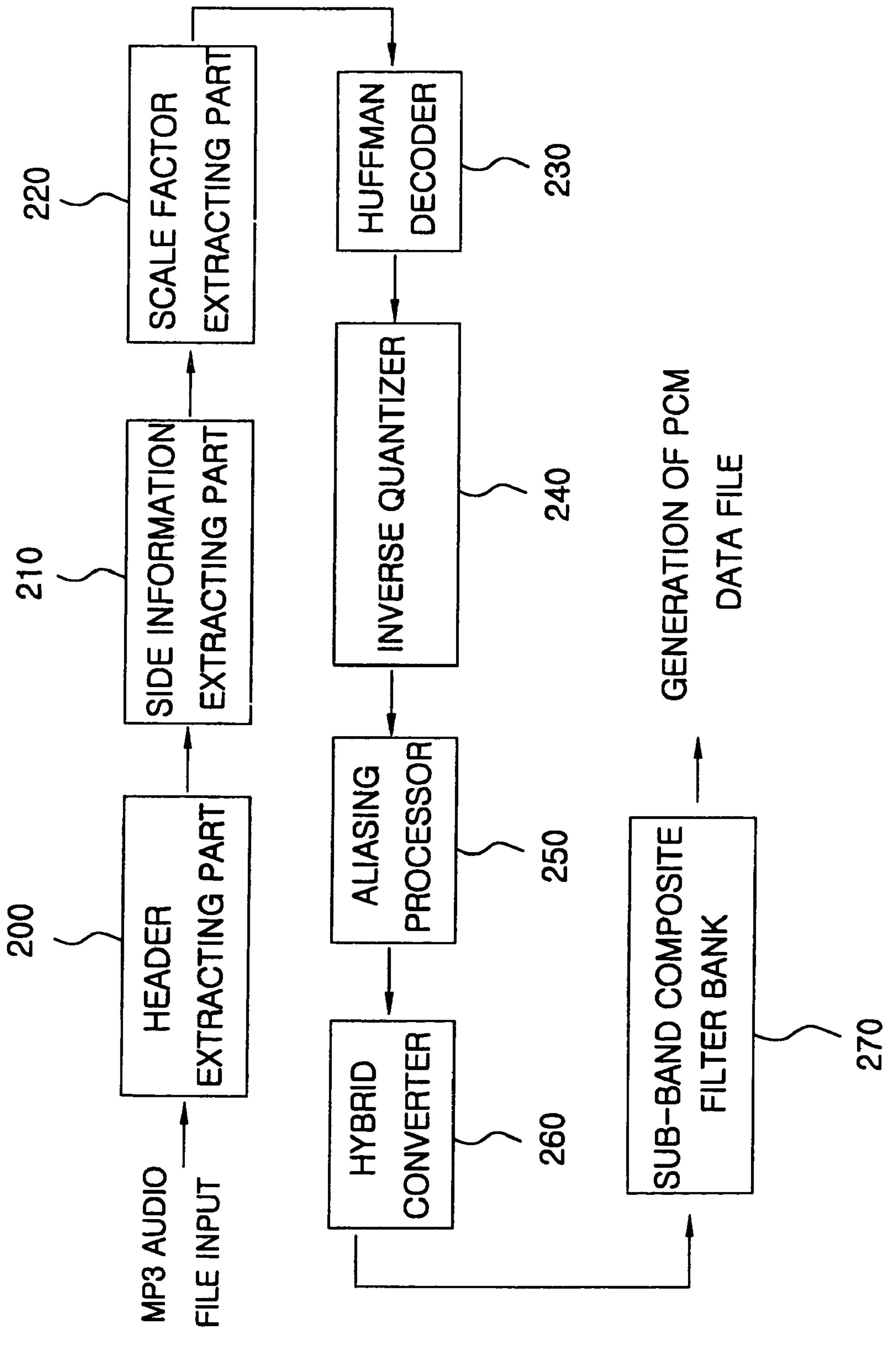

[FIG 6]
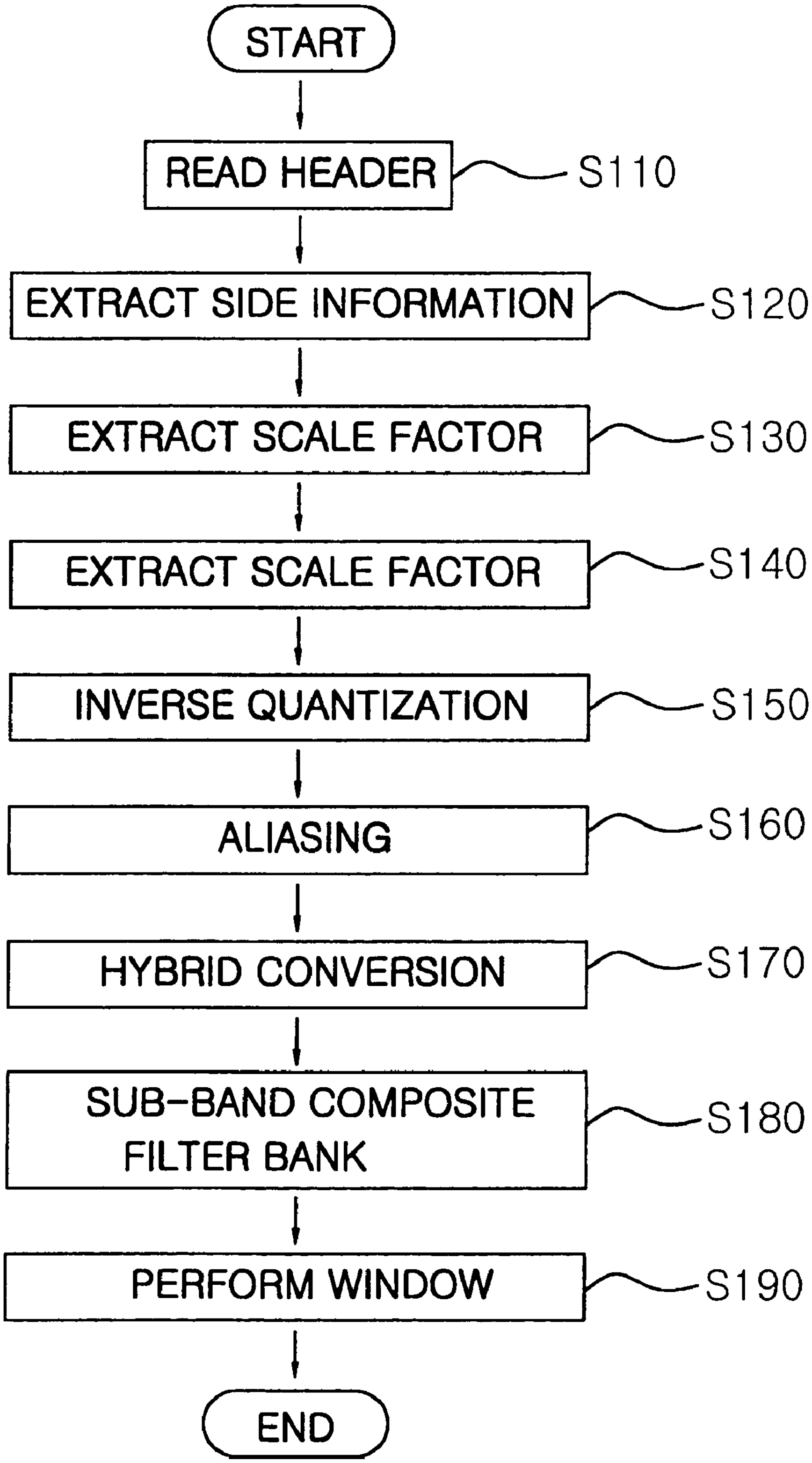

RAPIDLY OPTIMIZED WIRELESS MICROPHONE SYSTEM AND METHOD FOR CONTROLLING THEREOF

TECHNICAL FIELD

The present invention relates to a wireless microphone system and a method for controlling thereof, and more particularly, to a wireless microphone system having a rapidly optimized MP3 audio encoder and decoder, capable of reducing the amount of calculation without losing voice to minimize power consumption and complexity of the system, and a method for controlling the microphone system.

BACKGROUND ART

A microphone is generally used in order to allow lots of people to be able to hear an audio signal. A microphone system converts the audio signal into an electric signal through a microphone, amplifies the electric signal, and outputs the amplified signal through a speaker. That is, the microphone system amplifies and outputs a low-level audio signal that a user speaks such that many people in a large area can hear it.

The microphone is divided into wired and wireless modes. A wired mode microphone system is constructed in a manner that a microphone and an amplifier are connected through a connection line to input a audio signal outputted from the microphone to the amplifier via the connection line. This is simple in configuration but its user's movement is restricted by the connection line. In case of a wireless mode microphone system, its user can carry only a microphone and a transmitter so that the user can move freely. Accordingly, the wireless microphone is widely used for a stage performance, a lecture, etc.

The wireless microphone market is not activated yet. The market is built up with general industrial wireless microphone products as the main axis. As a microphone used for broadcast and performance, imported products are mainly employed. Especially, the wireless microphone requires accumulation of technical know-how. So medium and small enterprises cannot start positive technical development.

The wireless microphone technique is developed in such a manner that it continuously improves audio quality and simultaneously increases the number of users, and solves problems in frequency policy. With problems related with frequency, especially, ISM band of 2.4 GHz has been explored as a solution to the problem. In addition, a method of applying spread spectrum in consideration of digital transmission and noise problem has been also explored. Korean Patent Appln. 10-1999-0021676 of the inventor, entitled "Recording and decording system of wireless microphone", discloses a wireless microphone system to which the spread spectrum technique is applied.

Meanwhile, compression techniques for audio transmission have been also developed in various ways. Korean Patent Appln. 10-1999-0021675, entitled "wireless microphone", of the inventor also discloses a method of converting an audio signal into an MP3 form and transmitting the MP3 signal as a compression technique for audio transmission. However, this patent does not propose a fast optimization technique for converting audio data at a level required for the wireless microphone into MP3 audio signals.

The wireless microphone system needs the fast optimization technique because an MP3 encoder used for an MP3 player is not suitable for the wireless microphone.

A general MP3 player does not require real-time processing in encoding and decoding. That is, audio signals are temporarily stored after encoding and then decoded after a lapse of a predetermined period of time from the encoding in the MP3 player in most cases. This does not need rapid encoding and decoding. Accordingly, the MP3 encoder and decoder used for the conventional MP3 player cannot be applied to the wireless microphone system that requires real-time encoding and decoding.

DISCLOSURE OF INVENTION

Accordingly, the present invention is directed to a rapidly optimized wireless microphone system and a method of controlling thereof that substantially obviates one or more problems due to limitations and disadvantages of the related art.

An object of the present invention is to provide a wireless microphone having a rapidly optimized MP3 audio encoder and decoder, capable of reducing the amount of calculation without losing voice to minimize power consumption and complexity of the system, and a method of controlling the microphone system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a rapidly optimized wireless microphone system comprises a transmitting part including an MP3 audio encoder, an FEC encoder, a modulator, a PN spreader, a high-frequency modulator, a power amplifier, a first controller, for converting an audio signal inputted through a microphone into an MP3 audio signal, FEC-encoding, and PN-spreading the MP3 audio signal, and then modulating the signal, to transmit it; and a receiving part including a low-noise amplifier, a high-frequency demodulator, a PN despreader, a demodulator, an FEC decoder, an MP3 audio decoder, an audio interface, an oscillator, a PLL circuit, and a second controller, for receiving the signal transmitted from the transmitting part, PN-despreading, FEC-decoding, and MP3-decoding the received signal, and then converting the signal into the original audio signal, wherein the MP3 audio encoder does not use psycho-acoustic modeling and, accordingly, performs quantization at a bit rate higher than a predetermined first bit rate without driving an outer repetitive loop of a repetitive loop required for the psycho-acoustic modeling, to thereby convert the audio signal inputted through the microphone into the MP3 audio signal.

To accomplish the object of the present invention, there is provided a method of controlling a rapidly optimized wireless microphone system, comprising the first step in which a microphone receives an audio signal, and an MP3 audio encoder performs quantization at a bit rate higher than a predetermined bit rate to convert the audio signal into an MP3 audio signal, the MP3 audio encoder using no psycho-acoustic modeling, the MP3 audio encoder not driving an outer repetitive loop of a repetitive loop required for the psycho-acoustic modeling; the second step in which an FEC encoder receives the output signal of the MP3 encoder to FEC-encode it; the third step in which a modulator modulates the output signal of the FEC encoder into a carrier signal; the fourth step for PN-spreading the output signal of the modulator, modulating the PN-spread signal, amplifying it, and transmitting the amplified signal to the air; the fifth step for receiving the signal transmitted from the fourth step through an antenna, low-noise amplifying the received signal, demodulating it to detect the spread signal, and despreading the demodulated spread signal to convert it into the original signal; and the sixth step for demodulating the output signal of the fifth step to remove a carrier, and FEC-decoding it into the MP3signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIG. 1 illustrates a configuration of a transmitting part of a wireless microphone system according to the present invention;

FIG. 2 illustrates a configuration of a receiving part of a wireless microphone system according to the present invention;

FIG. 3 is a block diagram of the MP3 audio encoder of FIG. 1;

FIG. 4 illustrates a concept of psycho-acoustic model.

FIG. 5 is a block diagram of the MP3 audio decoder of FIG. 2; and

FIG. 6 is a flow chart for showing an MP3 audio decoding process.

BEST MODE FOR CARRYING OUT THE INVENTION

Reference will now be made in detail to the preferred embodiments of the present invention, examples of which are illustrated in the accompanying drawings.

FIG. 1 illustrates a configuration of a transmitting part of a wireless microphone system according to the present invention. Referring to FIG. 1, the transmitting part includes a microphone interface 11 for receiving an audio signal through a microphone 10, an MP3 audio encoder 12 for converting the audio signal inputted through the microphone interface into an MP3 signal according to fast optimization, an FEC (Forward Error Correction) encoder 13 for FEC-encoding the output signal of the MP3 audio encoder 12, a modulator 14 for modulating the output signal of the FEC encoder 13 into a carrier signal, a PN (Pseudo Noise) spreader 15 for PN-spreading the output signal of the modulator, a radio-frequency modulator 16 for modulating the output signal of the PN spreader 15 into a radio-frequency signal, a power amplifier 17 for amplifying the output signal of the high-frequency modulator and transmitting it to the air through an antenna 18, and a controller 19 for controlling the encoding operations of the MP3 audio encoder 12 and the FEC encoder 13 and the PN spreading operation of the PN spreader 15.

In the transmitting part of the microphone system constructed as above, an audio signal that is converted into an electric signal by the microphone 10 is inputted to the MP3 audio encoder through the microphone interface 11 and encoded into an MP3 signal under the control of the controller 19. It is assumed that output bit rate is 128 kbps, for example.

The MP3 audio encoder 12 is constructed such that it does not perform psycho-acoustic modeling procedure because the bit rate is sufficiently high (above 128 kbps per channel). Even though the psycho-acoustic modeling is omitted, there is no difference of sound quality from a case using the psycho-acoustic model. Accordingly, an external loop of a repetitive loop is not required.

The MP3 audio signal encoded by the MP3 audio encoder 12 is FEC-encoded by the FEC encoder 13 under the control of the controller 19, modulated into a carrier signal by the modulator 14, and then applied to the PN spreader 15.

The FEC encoder 13 performs RS coding. RS code endures concatenation error, and it can be used for powerful FEC when combined with interleaving in symbols. RS code rate has 150ksym/sec when frame overhead is added thereto in case that code (255, 144) is modulated. Here, interleaving depth should be set based on characteristic of a radio channel. In case of slow fading such as indoor radio environment, interleaving cycle should be increased. This is related with demodulation delay time. Thus, the interleaving cycle must be set to recover error with respect to deep fading within the limit causing no excessively large delay. When a codeword having the length of 255 byte is transmitted for 8 msce, for example, if interleaving is carried out for seven transmission frame sections, delay time of about 56 msce is generated according to an interleaver. If it is assumed that the average value of sections where the level of received signal is faded by above 10 dB is 10 msec, approximately, in the band of 2.4 GHz, the interleaving cycle is appropriate.

The PN spreader 15 spreads a signal applied thereto to PN noise under the control of the controller 19. This spread signal is modulated by the high-frequency modulator 16 into a high-frequency signal, amplified by the power amplifier 17, and then transmitted to the air through the antenna 18. For instance, the signal is spread according to gold code of spread coefficient 31 and then up-converted to 2.4 GHz to be transmitted.

PN code has the preference as a multiple access code in an asynchronous CDMA system in which synchronization in chips is not guaranteed. This is because the PN code has poor autocorrelation characteristic but has excellent cross-correlation characteristic. The PN code is created using preferred pair of ML-SSRS code and has only three cross-correlation values.

FIG. 2 illustrates a configuration of a receiving part of a wireless microphone system according to the present invention.

Referring to FIG. 2, the receiving part includes a low-noise amplifier 21 for low-noise-amplifying a high-frequency signal transmitted from the transmitting part and received through an antenna 20, a high-frequency demodulator 22 for demodulating the amplified high-frequency signal to detect a spread signal, a PN despreader 23 for despreading the demodulated spread signal to convert it into the original signal to remove a carrier, an FEC decoder 25 for FEC-decoding the output signal of the demodulator 24 to convert it into an MP3 signal, an MP3 voice decoder 26 for decoding the output signal of the FEC decoder 25 to convert it into the original audio signal, an audio interface 27 for outputting the signal decoded by the MP3 voice decoder 26, an oscillator 28 oscillating to generate an oscillation signal, a PLL circuit 29 for stabilizing the output signal of the oscillator 28, and a controller 31 for controlling the operations of the PN despreader 23, FEC decoder 25, and MP3 voice decoder 26 and displaying the operation state of a display 30 according to the output signal of the PLL circuit 29.

In the receiving part of the microphone system constructed as above, the oscillator 28 oscillates to generate an oscillation signal, and this oscillation signal is stabilized through the PLL circuit 29. The stabilized oscillation signal is applied to the controller 31 to be used for demodulation of a signal transmitted from the transmitting part.

A high-frequency signal sent from the transmitting part is received through the antenna 20, low-noise amplified by the low-noise amplifier 21, high-frequency demodulated by the high-frequency demodulator 22, to be applied to the PN despreader 23. The PN despreader 23 despreads the signal, demodulated by the high-frequency demodulator 22 and applied thereto, under the control of the controller 31. Here, noise removal is carried out using phase difference as conventional methods.

The despread signal is demodulated by the demodulator 24, whereby a carrier signal is removed from the signal. The signal from which the carrier signal is removed is FEC-decoded by the FEC decoder under the control of the controller 31, whereby the MP3 audio signal is detected. The MP3 audio signal is decoded again by the MP3 audio decoder 26 to be converted into the original analog audio signal.

The analog audio signal outputted from the MP3 audio decoder 26 is outputted through the audio interface 27. This analog audio signal is amplified by an amplifier and then outputted through a speaker.

FIG. 3 is a block diagram of the MP3 audio encoder of FIG. 1. Referring to FIG. 3, the MP3 audio encoder includes a sub-band filter bank 100, a hybrid converter 110, an FFT 120, a psycho-acoustic modeling part 130, and a repetitive loop part 140. The repetitive loop part 140 has a quantifier and a Huffman coding part.

The sub-band filter bank 100 receives an audio signal from the microphone interface and converts it into thirty-two sub-band samples to remove statistical redundancy of the audio signal. A sub-band filter bank process performed in the sub-band filter bank 100 is the same as the method used in a conventional MPEG audio layer-II. Accordingly, 6432 MAC operations can be replaced with a fast filter bank algorithm using 32-point DCT (Discrete Cosine Transform) for the purpose of obtaining the thirty-two sub-band samples. Here, since there are lots of fast algorithms in case of DCT, a period of time required for performing the filter bank procedure can be more improved if a DCT method the most effective in a system to be realized is employed. In this embodiment, the general 32-point DCT method was adopted that is able to minimize a programming technique and utilize MAC operation of DSP to the maximum.

The hybrid converter 110 performs MDCT (Modified Discrete Cosine Transform) for the sub-band samples to improve frequency resolution. Simultaneously, the psycho-acoustic modeling part 130 using the FFT 120 attains a masking threshold that is a noise level human cannot hear in order to remove perceptive redundancy due to human auditory characteristics.

The repetitive loop part 140 allocates quantization bits of MDCT spectrum so as to mask quantization noise subjectively by a signal based on the masking threshold, performs quantization, and carries out Huffman coding.

When the repetitive loop part 140 cannot completely mask the noise, it assigns bits by scale factor bands to minimize subjective noise. Quantized MDCT spectrum is Huffman-coded to become a bit stream together with additional information.

In the coding procedure of the MP3 audio encoder, the amount of calculation in the psychological operation modeling process performed by the psycho-acoustic modeling part 130 is given much weight. Especially, psycho-acoustic modeling includes lots of calculations that are not suitable for a DSP chip, exponential calculation, and the like. Thus, it is the most difficult obstacle in real-time performance of the encoder.

The psycho-acoustic model is used in the audio coding procedure for the purpose of appropriately arranging quantization errors according to characteristics of an input signal in the frequency domain in audio signal compression with a very low bit rate such that the errors are not heard. In case that there is no loss of sound quality even when the audio signal is quantized because of sufficiently high bit rate (above 128 kbps per channel), there may be no sound quality difference from a case using the psycho-acoustic model even if coding is performed without using the psycho-acoustic model.

FIG. 4 illustrates a concept with respect to distribution of quantization errors according to bit rates and according as the psycho-acoustic model is used or not. For cases A and B, quantization is performed with the same bit rate. But A does not use psycho-acoustic model and B uses it. In case of B, quantization noise is distributed under the masking threshold that is not heard, which means noise shaping. When quantization is carried out such that quantization noise is distributed as in the case A, however, perceptive loss is brought about at a portion where quantization noise is higher than the masking level.

In case of C, the overall quantization error level is sufficiently low even when quantization step is determined without using psycho-acoustic model due to bit rate higher than bit rate in the cases A and B. Accordingly, quantization noise does not exceed the masking threshold. In case that average quantization noise is low as in the case C, that is, when the bit rate is sufficiently high, it can be known that there is no need to use psycho-acoustic model.

On the basis of the above-mentioned, an unofficial subjective sound quality estimation experiment was performed for the purpose of inquiring a variation in sound quality according as the psycho-acoustic model is used or not at 128 kbps. As a result, a sound quality difference according as the psycho-acoustic model is used or not is hardly felt for all samples. In addition, the sound quality difference is not felt at all for the original sound.

Meanwhile, time-axis waveform in case where the psycho-acoustic model is used was compared with that in case where the psycho-acoustic model is not used. The result was that lots of errors are generated in a granule (minimum unit for which coding is performed (576 samples)) using a short-period window during MDCT procedure. In a granule using a long-period window, error was zero. In case where the psycho-acoustic model was not used, small error is generated because the short-period window was not used. However, error in this case is sufficiently small so as to be able to be masked by the original signal so that it does not affect sound quality. From experimental results, cases that actually use the short-period window for various samples were average 1% or less.

From the above-mentioned facts, it can be known that there is little loss of sound quality of an encoded signal compared with the original sound without regard to whether the psycho-acoustic model is used or not when the coding bit rate is sufficiently high. Accordingly, the present invention does not use the psycho-acoustic model to reduce the amount of calculation.

A repetitive loop of the repetitive loop part 140 is a routine of performing quantization and Huffman coding based on the result of psycho-acoustic modeling. The original repetitive loop is constructed in a manner that two loops are engaged with each other. The inner loop of the two loops performs quantization, and then the outer loop checks if the quantized result fulfils the requirement of the psycho-acoustic model. When the result does not, the inner loop newly carries out quantization until the requirement is fulfilled.

Accordingly, the number of times of repeating the loop largely depends on characteristic of a signal. In an excessive case, the outer loop is repeated fifteen times or more and the inner loop is repeated 30~50 times for each outer loop. Furthermore, quantization and inverse quantization that must be carried out for every loop include complicated exponential computation for nonlinear quantization. So they are difficult to perform in a DSP. Therefore, to reduce the number of times of repetition decreases the amount of calculation.

The present invention does not require the outer repetitive loop that inspects the relation between the result of psycho-acoustic modeling and quantization error because the invention does not use the psycho-acoustic model. It means that coding is possible only with the inner repetitive loop among the entire repetitive loop without loss of sound quality. Here, values such as scale factor determined by the outer loop are defined as zero in advance. In addition, a function for active adaptation from the initial quantization step size to the final quantization step size was proposed and used in order to minimize the number of times of repeating the inner repetitive loop that decides the quantization step size. As a result, the number of loop repeating times of 30~50 times was reduced to only 2~3 times. Thus, the period of time required for the performance was improved average ten times or more.

FIG. 5 is a block diagram of the MP3 audio decoder, and FIG. 6 is a flow chart showing an MP3 audio decoding procedure.

Referring to FIGS. 5 and 6, the MP3 audio decoder includes a header extracting unit 200, a side information extracting unit 210, a scale factor extracting unit 220, a Huffman decoder 230, an inverse quantifier 240, an aliasing unit 250, a hybrid converter 260, and a sub-band composite filter bank 270.

Every MPEG bit stream is configured of a set of bits in frames (1152samples). The number of frames fixed per second for each MPEG format means generation of output samples fixed having a fixed size of each input frame for a fixed bit rate (128 kbps) and sampling frequency (32 KHz).

Frames are independent in MPEG audio. Accordingly, Frame is started by finding a synchronous bit pattern placed at the first of the frame. The header extracting unit 200 finds the synchronous bit pattern, and then reads frame header (step S110). The side information extracting unit 210 can read side information (step S120). The header and side information contain information about the fact that how the frame was encoded. The decoder comes to know the relation with the data contained in the frame.

The scale factor extracting unit 220 reads data right after the header, to extract a scale factor that controls a gain for each frequency band (step S130).

Subsequently, the Huffman decoder 230 performs Huffman decoding (step S140). The Huffman decoding should select a suitable Huffman decoding table differently from Huffman encoding that selectively uses a table.

The inverse quantifier 240 readjusts constant values generated after the Huffman decoding step into energy values in the actual frequency domain according to the scale factor (step S150). In case where an input stream is stereo, a stereo processing step is needed.

Thereafter, the aliasing unit 250 adds up frequency values in each frequency band symmetrically in order to mitigate aliasing distortion generated during quantization (step S160).

Although all signals have been processed in the frequency domain, the hybrid converter 260 performs frequency-time conversion, that is, it enters the result of aliasing as an input of inverse MDCT to carry out frequency-time conversion (step S170).

Samples processed as above are sent to the sub-band composite filter bank 270. The sub-band composite filter bank employs convolution-addition method in order to eliminate discontinuity created during inverse MDCT (step S1180).

Finally, low pass filtering is carrying out by taking a window in sine waveform, and final PCM samples are outputted (step S190).

Meantime, the sub-band composite filter bank procedure should pass through 32*64 composite matrix. Since the procedure must be repeated eighteen times in order to process one granule (minimum unit for which coding is performed (576samples)), the matrix (32*64=2048) that requires multiplication and addition becomes a large burden.

However, MPEG audio standard uses DCT to convert samples from one region to another region. Accordingly, elements of the composite matrix have forms similar to the kemal of DCT. This fact is used together with symmetric property of cosine function to change the matrix computation procedure into 32-point IDCT, thereby reducing the amount of calculation by half. Here, since DCT can use a variety of fast DCT operations, the sub-band procedure can be processed more rapidly.

The hybrid converter 260 should perform conversions with different sizes according to block types (short period: short or long period: long) determined from the result of the psycho-acoustic modeling. However, the hybrid conversion is carried out only in case of 18-point because only the long-period window is used in this embodiment all the time. Even the hybrid conversion reduced the amount of computation using the matrix conversion method applied to the sub-band composite filter bank.

The inverse quantifier 240 uses a previously calculated table in case where the Huffman-decoded value is 256 or less in order to easily process computation with respect to exponential multiplier expressions generated during the inverse quantization procedure. When the value is larger than 256, the exponential multiplier calculation is carried out by taking 256 as the maximum value or using numerical analysis.

For the Huffman decoding, the table is rearranged in a manner that a predetermined part of the table is cut off in advance so as to increase search speed.

Specifically, in case of the conventional Huffman decoding block, X and Y values based on comparison by bits are sequentially extracted using a table defined by MPEG audio standard. The same decoding algorithm is applied for searching and decoding a desired code in the Huffman table with regard to the length of the code. Accordingly, in case of a short code, unnecessary time is consumed. To solve this problem, a predetermined part of the table is cut off in advance so as to increase search speed.

A corresponding H_cue table is selected according to the degree of Huffman-encoded length and stored in a lag. The value stored in the lag is moved to the right one bit, and then the lag value is added to the corresponding table. It is compared if the lag is larger than 1, and the process goes to a corresponding routine. Finally, a value indicated by h_tab address is compared with chunk to increase or decrease the h_tab address. A value corresponding to the final x is extracted by moving the value indicated by the h_tab address to the right by four bits and then bitwise-Anding with 0×1f. y-value is obtained by moving the value to the right by eight bits and masking it with 0×1f.

INDUSTRIAL APPLICABILITY

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

According to the present invention, the transmitting part of the microphone system uses the sound modeling procedure and MP3 encoder having no outer loop, and its receiving part employs the optimized MP3 decoder so that the wireless microphone system can provide high sound quality in real time.

What is claimed is:

1. A rapidly optimized wireless microphone system comprising:

a transmitting part including an MP3 audio encoder, an FEC encoder, a modulator, a PN spreader, a high-frequency modulator, a power amplifier, a first controller converting an audio signal inputted through a microphone into an MP3 audio signal, FEC-encoding, and PN-spreading the MP3 audio signal, and then modulating the signal, to transmit it;

a receiving part including a low-noise amplifier, a high-frequency demodulator, a PN despreader, a demodulator, an FEC decoder, an MP3 audio decoder, an audio interface, an oscillator, a PLL circuit, and a second controller receiving the signal transmitted from the transmitting part, PN-despreading, FEC-decoding, and MP3-decoding the received signal, and then converting the signal into the original audio signal, wherein the MP3 audio encoder does not use psycho-acoustic modeling and, accordingly, performs quantization at a bit rate higher than a predetermined first bit rate without driving an outer repetitive loop of a repetitive loop required for the psycho-acoustic modeling, to thereby convert the audio signal inputted through the microphone into the MP3 audio signal;

wherein the MP3 audio decoder comprises:

a side information extracting part finding a frame synchronous bit pattern from a frame in MPEG audio, reading frame header, extracting side information, and extracting a scale factor;

a Huffman decoder selecting a proper Huffman table to perform Huffman decoding;

an inverse quantifier readjusting constant values created after the Huffman decoding into energy values in the actual frequency domain according to the scale factor;

an aliasing processor adding up frequency values in each frequency band symmetrically to remove aliasing distortion in order to mitigate the aliasing distortion generated during quantization;

a second hybrid converter entering the result of the aliasing process as an input of MDCT, to perform frequency-time conversion; and a sub-band composite filter bank applying convolution-addition method in order to remove discontinuity generated during inverse MDCT;

wherein a matrix calculation procedure performed by the sub-band composite filter bank is converted into 32-point IDCT so as to reduce the amount of calculation by half; and wherein the second hybrid converter reduces the amount of matrix calculation using the matrix conversion method applied to the sub-band composite filter bank.

2. A rapidly optimized wireless microphone system comprising:

a transmitting part including an MP3 audio encoder, an FEC encoder, a modulator, a PN spreader, a high-frequency modulator, a power amplifier, a first controller converting an audio signal inputted through a microphone into an MP3 audio signal, FEC-encoding, and PN- spreading the MP3 audio signal, and then modulating the signal, to transmit it;

a receiving part including a low-noise amplifier, a high-frequency demodulator, a PN despreader, a demodulator, an FEC decoder, an MP3 audio decoder, an audio interface, an oscillator, a PLL circuit, and a second controller receiving the signal transmitted from the transmitting part, PN-despreading, FEC-decoding, and MP3-decoding the received signal, and then converting the signal into the original audio signal, wherein the MP3 audio encoder does not use psycho-acoustic modeling and, accordingly, performs quantization at a bit rate higher than a predetermined first bit rate without driving an outer repetitive loon of a repetitive loop reguired for the psycho-acoustic modeling, to thereby convert the audio signal inputted through the microphone into the MP3 audio signal;

wherein the MP3 audio decoder comprises:

a side information extracting part finding a frame synchronous bit pattern from a frame in MPEG audio, reading frame header, extracting side information, and extracting a scale factor;

a Huffman decoder selecting a proper Huffman table to perform Huffman decoding;

an inverse quantifier readjusting constant values created after the Huffman decoding into energy values in the actual frequency domain according to the scale factor;

an aliasing processor adding up frequency values in each frequency band symmetrically to remove aliasing distortion in order to mitigate the aliasing distortion generated during quantization;

a second hybrid converter entering the result of the aliasing process as an input of MDCT, to perform frequency-time conversion; and a sub-band composite filter bank applying convolution-addition method in order to remove discontinuity generated during inverse MDCT; and wherein the Huffman decoder performs Huffman decoding using a table, a predetermined part of which is cut off in advance to increase search speed.

* * * * *